Figure 1:
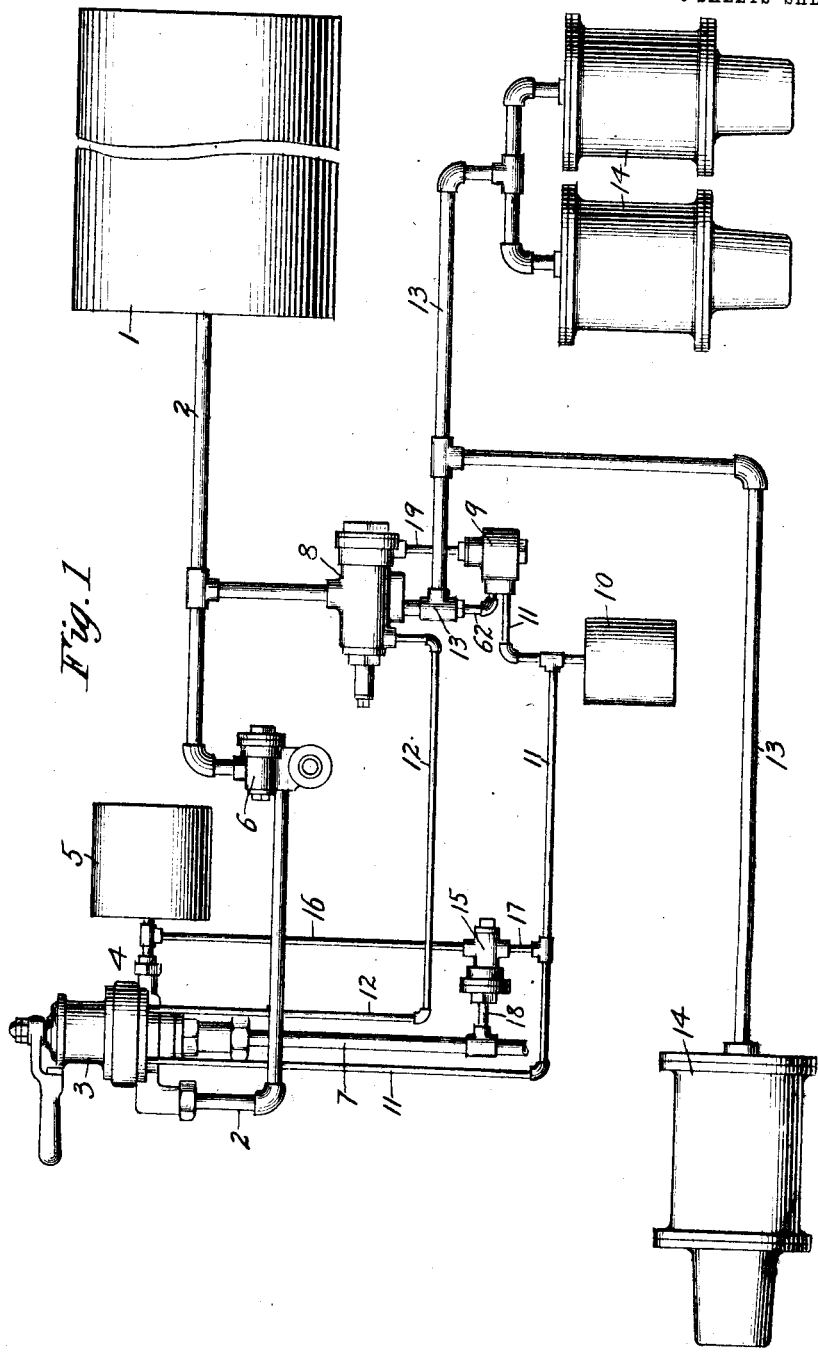

W. V. TURNER.
FLUID PRESSURE BRAKE.
APPLICATION FILED OCT. 5, 1904.

1,063,751.

Patented June 3, 1913.
5 SHEETS—SHEET 1.

W. V. TURNER.
FLUID PRESSURE BRAKE.
APPLICATION FILED OCT. 5, 1904.

1,063,751.

Patented June 3, 1913.
5 SHEETS—SHEET 2.

WITNESSES

INVENTOR
Walter V. Turner
by E. H. Wright
Att'y.

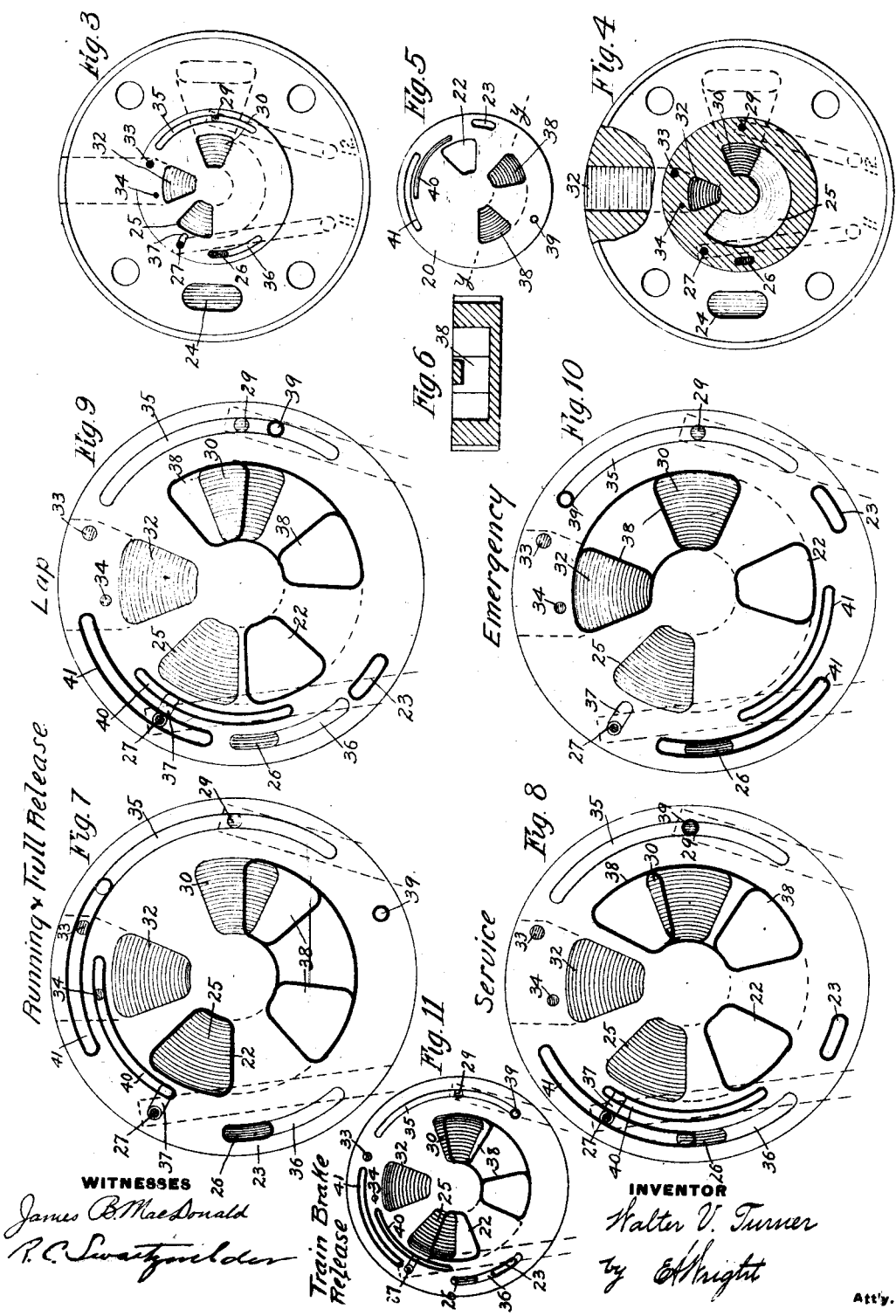

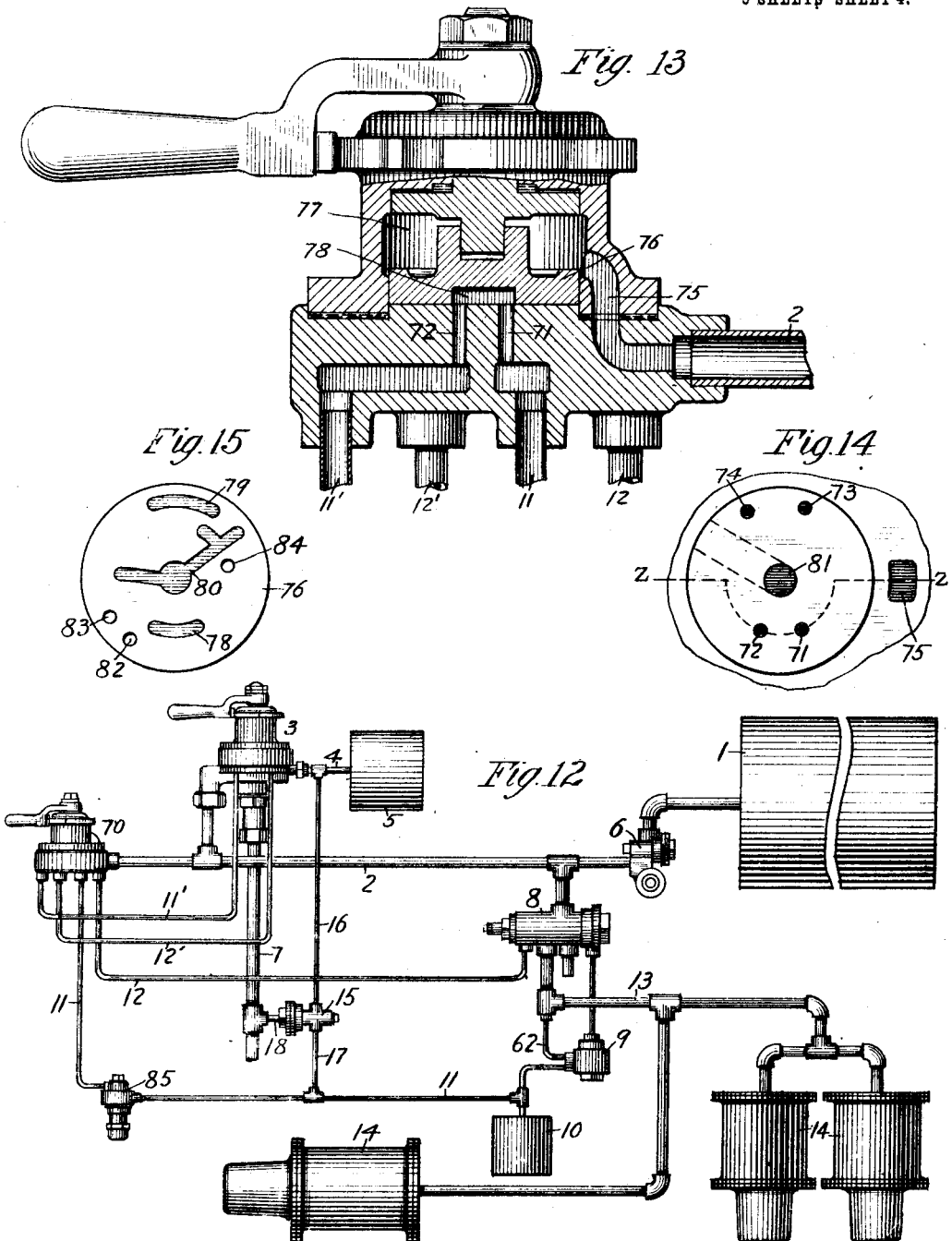

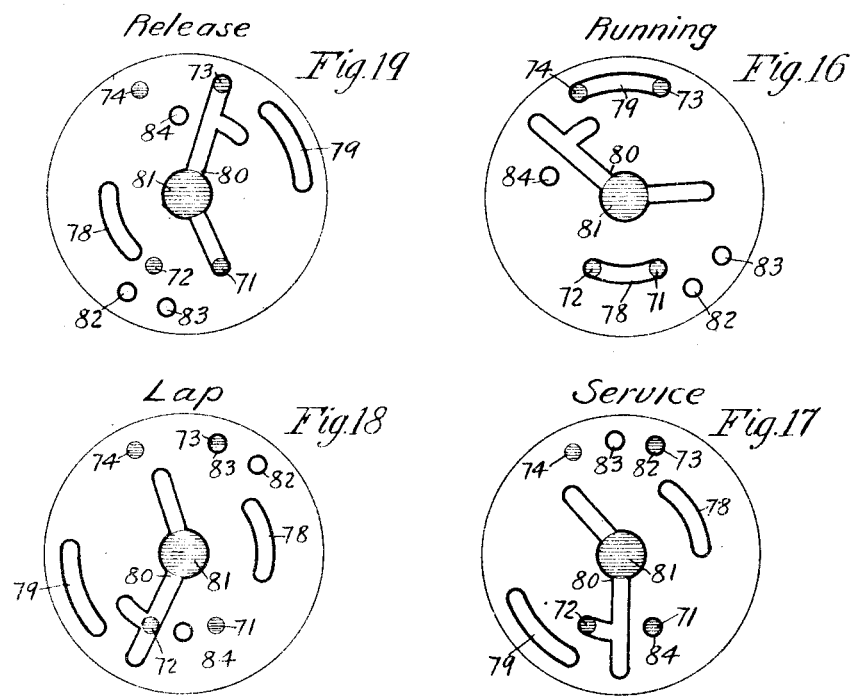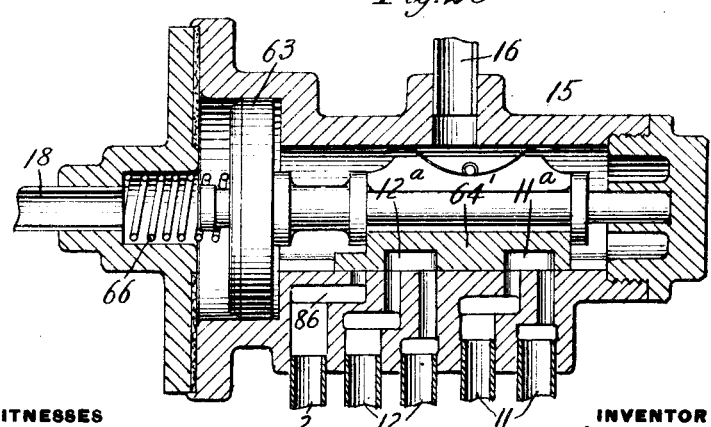

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

FLUID-PRESSURE BRAKE.

1,063,751.  Specification of Letters Patent.  Patented June 3, 1913.

Application filed October 5, 1904. Serial No. 227,222.

*To all whom it may concern:*

Be it known that I, WALTER V. TURNER, a citizen of the United States, residing in Wilkinsburg, county of Allegheny, and State of Pennsylvania, have invented a certain new and useful Improvement in Fluid-Pressure Brakes, of which the following is a specification.

This invention relates to fluid pressure brake systems, and more particularly to the locomotive equipment for such apparatus, the main object being to provide an engineer's brake valve for the automatic train brakes and means controlled by said brake valve for supplying air from the main reservoir to the brake cylinders on the engine or on the engine and tender, whereby the usual auxiliary reservoirs and triple valves as now used for these brakes on the engine and tender may be entirely dispensed with.

Another object of the invention is to restrict the degree of air pressure supplied to the train pipe in releasing the brakes to the normal standard train pipe pressure which is carried in the system, and thereby prevent the possibility of overcharging the train pipe and auxiliary reservoirs by the excess pressure which is usually carried in the main reservoir. According to this feature of the invention, if no excess pressure was carried in the main reservoir no feed or reducing valve would be required, but it is preferred to retain the higher main reservoir pressure as now used and to reduce this pressure by means of a feed or reducing valve set at the desired maximum degree of train pipe pressure and so arranged as to regulate the pressure admitted from the main reservoir to the train pipe when the engineer's brake valve is operated to release the brakes and recharge the train pipe. It will be evident that various ways of connecting up the reducing valve may be employed for producing this result, but I prefer to locate the reducing valve between the main reservoir and the engineer's brake valve whereby the maximum pressure supplied from the main reservoir to the engineer's brake valve is cut down to the normal maximum degree of train pipe pressure at which the system is to be operated and the so-called "full release" and "running" positions of the present standard engineer's brake valve may be combined into one position, in which the ports through the brake valve to the train pipe are fully open.

Another object is to provide an improved combined automatic and straight air brake equipment, in which the engine brakes may be operated with air direct from the main reservoir in both the automatic and straight air systems.

My invention is also in the nature of an improvement on the construction disclosed in a patent to H. T. Herr No. 898,885 of September 15, 1908, in which, as in the present case, a regulating chamber is employed, variations in pressure in said chamber being adapted to govern means for supplying air in graduated amounts from a reservoir or source of fluid pressure to the brake cylinder.

I will now describe more specifically a form of apparatus embodying the various features of my invention, reference being had to the accompanying drawings, in which—

Figure 2:
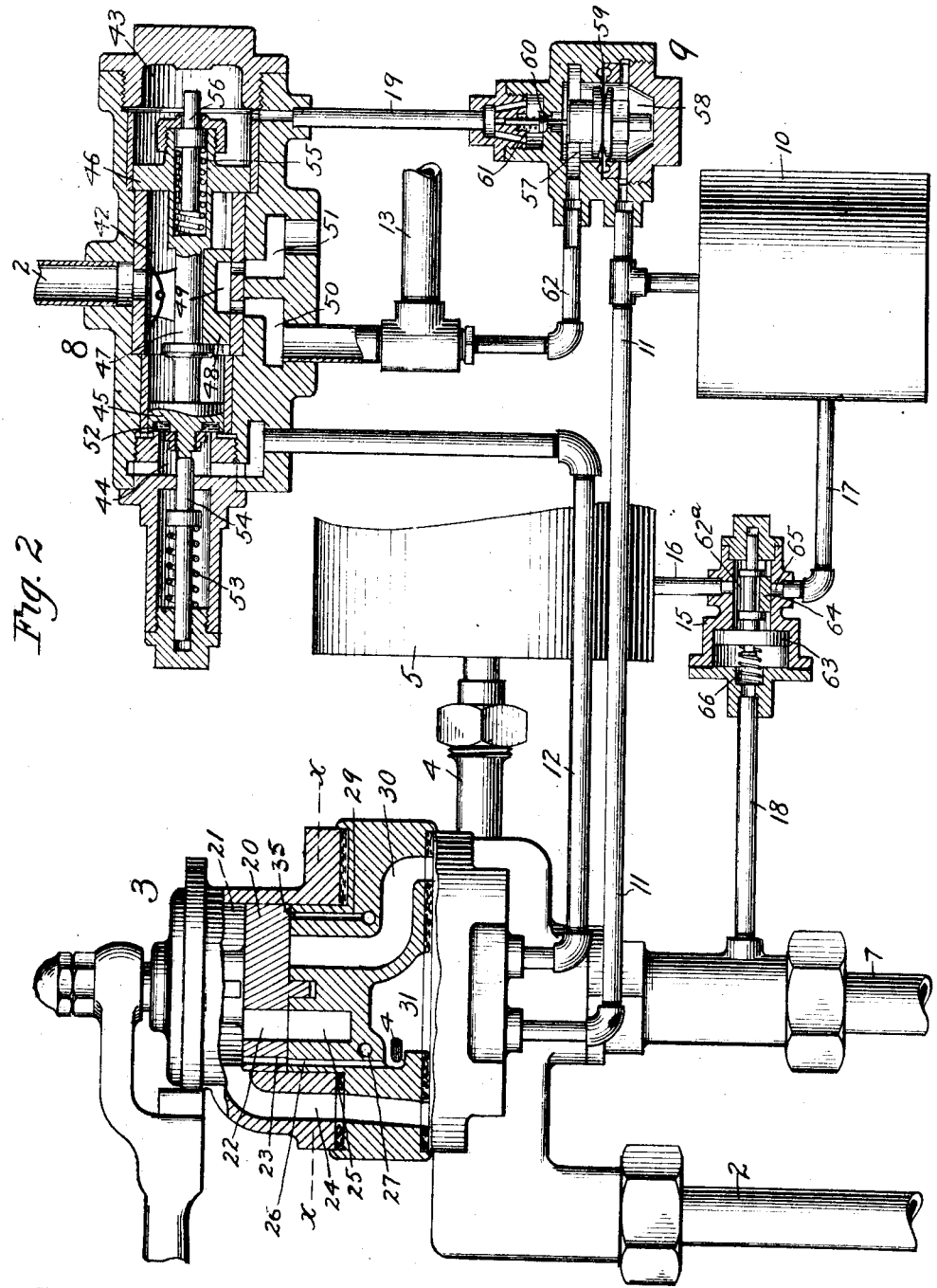

Figure 1 is a diagrammatic view showing a locomotive equipment for an automatic air brake system; Fig. 2 a similar view upon a larger scale showing the valve devices in vertical section; Fig. 3 a plan view of the rotary valve seat of the engineer's brake valve; Fig. 4 a horizontal section of the engineer's brake valve taken on the line *x—x* of Fig. 2; Fig. 5 a face view of the rotary valve of the engineer's brake valve; Fig. 6 a sectional view of the rotary valve taken on the line *y—y* of Fig. 5; Fig. 7 a plan view of the brake valve seat showing the relative positions of the ports when the valve is in the full release position which is also the running position, the ports in the valve seat being indicated in light lines and the ports in the valve in heavy lines; Fig. 8 a view similar to Fig. 7, but showing the valve in position for making a service application of the brakes; Fig. 9 a similar view showing the valve in lap position; Fig. 10 a similar view showing the valve in position for making an emergency application; Fig. 11 a similar view showing the valve in position for releasing the automatic brakes on the train but holding the engine brakes applied; Fig. 12 a diagram showing my improved combined automatic and straight air brake equipment adapted for controlling the automatic train brakes and the locomotive brakes independently; Fig. 13 a vertical section of the straight air brake valve taken on the line z—z of Fig. 14; Fig. 14 a plan view of the rotary valve seat; Fig. 15 a face view of the rotary valve; Figs. 16, 17, 18 and 19 diagrams showing the relative positions of the ports in the rotary valve and seat of the straight air brake valve in the running, service, lap and release positions respectively; and Fig. 20 a vertical sectional view showing a modified form of the emergency valve device.

According to the main feature of this invention air is supplied from the main reservoir or other source to the locomotive brake cylinders through what may be termed a distributing valve device, the operation of which is controlled by the usual movements of the engineer's brake valve in operating the automatic train brakes. This distributing valve device may be of any desired construction, to which the desired pressure is supplied by the movement of the engineer's brake valve and which then operates automatically to open communication from the main reservoir to the brake cylinder and to supply the desired pressure thereto. According to a preferred construction this distributing valve device comprises a main valve for controlling communication from the main reservoir to the brake cylinder, and a regulating device or valve for governing the action of the main valve, the pressure on said regulating device being controlled by the movement of the engineer's brake valve in applying and releasing the automatic train brakes. Any desired mechanism operated by the movement of the engineer's brake valve may be employed for controlling the pressure upon said distributing valve device, or upon the regulating part of said device, but according to the preferred arrangement, and this comprises another important feature of my invention, air under pressure which is discharged in order to produce a train pipe reduction in service applications is supplied to said distributing valve device for operating the same. This air under pressure may be taken from any train pipe discharge port or, where the engineer's brake valve is provided with an equalizing reservoir and piston, as in the standard Westinghouse system, the air may be taken from the preliminary discharge from the equalizing reservoir, the size of ports and chambers being so proportioned as to give the desired pressure upon the distributing valve device and consequently in the locomotive brake cylinders corresponding to the given reduction in train pipe pressure.

Referring to the construction shown in Sheets 1, 2 and 3 of the drawings, the main reservoir 1 is connected by means of pipe 2 with the engineer's brake valve 3 and also with the distributing valve 8, and in the pipe 2 is located a feed valve 6, whereby the pressure supplied from the main reservoir to the engineer's brake valve is reduced to 70 lbs. per square inch, or whatever degree of normal train pipe pressure it is desired to carry. Air at this pressure is introduced through passage 24 to the chamber 21 above the rotary valve 20, which is provided with through ports 22, 23 and 39, and cavities 38, 40 and 41.

The main valve seat is provided with ports as follows:—25 leading around to port 30, which is directly connected to the train pipe 7, 32 exhaust port leading to the atmosphere, 26 leading to the usual chamber 31 above the piston of the train pipe discharge valve, which chamber is connected by pipe 4 with the equalizing reservoir 5, as in the ordinary standard construction, ports 33 and 34 leading to exhaust port 32, port 27 leading to pipe 11 connected to the regulating part 9 of the equalizing valve mechanism, and port 29 leading to pipe 12 which is connected to the chamber 44 of the distributing valve. Ports 29 and 26 are provided with circumferential grooves 35 and 36 respectively located in the face of the valve seat and a short radial groove 37 communicates with the port 27.

As shown, more particularly in Fig. 2, the distributing valve 8 comprises a casing having a valve chamber 42 containing a valve 48 and stem 47 operated by the differential pistons 45 and 46. Springs 53 and 55, with their respective stems 54 and 56 are employed for normally moving the valve 48 to its lap position when the piston heads 45 and 46 are balanced as to fluid pressure. The port 50 is connected by pipes 13 to the brake cylinders 14 of the engine or of the engine and tender, and the cavity 49 in slide valve 48 is adapted to open communication from the brake cylinders to the exhaust port 51 when in the position shown.

For the purposes of illustration the regulating device 9 is shown separate from the main valve casing 8 and connected to chamber 43 in the rear of piston 46 by means of pipe 19. The diaphragm 59 is subject to the opposing pressures of the brake cylinder chamber 57 which is connected by pipe 62 with the brake cylinder pipe 13, and the regulating chamber 58, which communicates with pipe 11. A small vent valve 60 having a spring 61 is operated by the diaphragm for controlling the release of air under pressure from the chamber 43. For the purpose of giving the desired volume to the regulating chamber 58 a small reservoir 10 may be connected thereto.

The operation of my improved apparatus as thus far described is as follows:—The main reservoir being charged by the air pump in the usual way, air under pressure flows through pipe 2, the reducing valve 6, and port 24 to the chamber 21 of the engineer's brake valve. Considering the brake valve in running and release position, as indicated in Figs. 2 and 7, the air then flows through port 22 in the rotary valve and ports 25 and 30 direct to the train pipe, charging the same and the auxiliary reservoirs throughout the train to the normal standard pressure. Air also flows through ports 23 and 26 to chamber 31 and equalizing reservoir 5, whereby all parts of the engineer's brake valve are charged to the same pressure. In this position of the valve it will be noticed that the regulating chamber 58 is open to the atmosphere through pipe 11, ports 27, 37, 40 and 34, so that the diaphragm 59 is in equilibrium and the valve 60 closed. Air from the main reservoir pipe 2 also enters the chamber 42 of the distributing valve and immediately leaks around the piston 46 charging the chamber 43 to the same pressure, whereby said piston is balanced as to fluid pressure upon its opposite sides. The space 44 on the rear of the piston 45 is, however, open to the atmosphere through pipe 12, ports 29, 35, 41 and 53, so that the pressure in chamber 42 acting on piston 45 moves the valve 48 to release position, compressing spring 53 and seating said piston upon its gasket 52 to prevent any leakage. The engine brake cylinders are then open to the atmosphere through pipe 13, port 50, cavity 49 and exhaust port 51. When it is desired to make a service application of the brakes, the brake valve is turned to service position, indicated in Fig. 8, in which communication from the supply chamber 21 to the train pipe and equalizing reservoir is cut off, and the cavity 41 establishes communication from the port 26 to the preliminary discharge port 27 leading to the pipe 11 and the regulating chamber 58, and 10. This chamber is made of such volume that when the air at standard pressure from the equalizing reservoir is equalized into said regulating chamber the resultant pressure will equal the desired maximum brake cylinder pressure. In this position of the brake valve the port 39 opens communication through port 29 and pipe 12 with the space 44 on the rear of piston 45, thereby balancing the fluid pressure upon the opposite side and allowing the spring 53 to move the valve to lap position. At the same time, the pressure which accumulates in the regulating chamber acting on diaphragm 59 opens valve 60 and relieves the pressure in chamber 43 upon the rear of piston 46, whereupon the preponderating pressure in chamber 42 moves the pistons and valve 47 to its application position, compressing the spring 55 and opening communication from the chamber 42 and main reservoir pipe through the port 50 to the pipe 13 and the brake cylinders 14. This reduction in pressure from the equalizing reservoir 31 operates as usual to reduce the train pipe pressure and apply the automatic train brakes in the ordinary way at the same time that my improved distributing valve mechanism is operating to supply air from the main reservoir to the locomotive brake cylinders. When the desired reduction has been made, the brake valve is turned back to lap position, indicated in Fig. 9, in which the preliminary discharge from the equalizing reservoir to the regulating chamber is cut off, but the port 39 still communicates through groove 35 and port 29 with pipe 12 and space 44, so that the piston head 45 remains substantially balanced as to fluid pressure. It may here be stated that these fluid pressures upon opposite sides of piston 45 will be equal if a reducing valve is located between the main reservoir and the chamber 42, as indicated in Fig. 12, but where main reservoir pressure is admitted directly to valve chamber 42, as indicated in Fig. 1, the excess pressure upon the right side of piston 45 is counteracted by the use of a stronger spring 53, so that the device operates the same in either case. When the port 50 is open air flows to the locomotive brake cylinders until the pressure therein and consequently in chamber 57 is equal to that in the regulating chamber beneath the diaphragm 59, when the valve 60 closes, and as the pressure immediately equalizes around piston 46 the spring 55 moves the piston and valve back to lap position with port 50 closed and the valve stem touching the spring actuated stem 54. All ports are now closed and both the train brakes and locomotive brakes are held applied with the desired pressure. Further movement of the engineer's brake valve to service position and back to lap, serves to increase the braking pressure on both locomotive and train in the same manner as above described. Should there be any leakage from the engine brake cylinders, and consequently in chamber 57, during the time that the brakes are held applied, the pressure in the regulating chamber which remains constant, will move the diaphragm to open vent valve 60 and cause the movement of piston 46 and valve 48 to supply just sufficient air from the main reservoir to compensate for such leakage and maintain the brake cylinder pressure constant. When it is desired to release the brakes, the brake valve is turned back to release and running position, Fig. 7, in which the wide ports 22 and 25 open communication to the train line and a large volume of air at the standard train line pressure is supplied from the feed or reducing valve, which is of large capacity, to the train pipe for raising the pressure therein and releasing the triple valves throughout the train. The equalizing reservoir is recharged through ports 23 and 26, as before described, while the air from the regulating chamber is released to the atmosphere through ports 27, 40 and 34 and the chamber 44 in the rear of piston 45 is also open to the atmosphere through pipe 12, ports 29, 35, 41 and 33. The pressure in chamber 42 therefore instantly moves the piston 45 over against its gasket and the cavity 49 in valve 48 establishes communication from the brake cylinder pipe 13 and port 50 to exhaust port 51, thereby releasing the air from the locomotive brake cylinders to the atmosphere. In this manner, the release of all the brakes will be substantially simultaneous. If it be desired to release the train brakes only and hold the engine brakes applied while the train pipe and auxiliary reservoirs are being recharged, the brake valve may be turned back from lap to a position marked train brake release, Fig. 11, in which the ports 22 and 25 are open for supplying air direct to the train pipe for releasing the triple valves and recharging the auxiliary reservoirs, but the ports controlling communication from the regulating chamber 58 and the release chamber 44 of the equalizing valve device are still held closed, so that the pressure is retained in these chambers and the valve 48 with its pistons consequently remains in lap position, preventing the release of air from the engine brake cylinders. In this way the engine brakes may be held applied while the train brakes are released and recharged, and may then be released at any time desired by moving the brake valve to full release and running position, as above described. It will also be apparent that the engine brake cylinder pressure may be graded down as desired by moving the engineer's brake valve to full release position and then back to lap or train brake release position, whereby air is released from chamber 44 and then supplied again thereto, causing a movement of valve 48 to discharge a portion of the air from the brake cylinders and then to close the exhaust by action of spring 53.

When it is desired to make a quick stop, as in case of emergency, the brake valve is thrown to this position, indicated in Fig. 10, in which the train pipe is open direct to the atmosphere through the large cavity 38 and exhaust port 32, thereby producing a sudden reduction in train pipe pressure and causing the emergency or quick-action of the triple valves throughout the train in the usual way. In order to secure a rapid equalization of the pressure from the equalizing reservoir 5 into the regulating chamber for securing a quick application of the engine brakes in emergency applications, a valve device 15 is provided comprising a piston 63 and valve 64 normally closing a port 65 connected by pipe 17 with the regulating reservoir, the valve chamber 62ᵃ being connected with the equalizing reservoir through pipe 16, and the train pipe communicating through pipe 18 with the opposite side of piston 63. The spring 66 normally holds the valve in position shown with port 65 closed and the piston has no tendency to move back in service applications of the brakes as the train pipe pressure upon one side is never materially less than that of the equalizing reservoir on the other side. In emergency applications, however, the sudden reduction in train pipe pressure below that of the equalizing reservoir causes the piston 63 to move the valve 64 to open port 65, whereby the pressure from the equalizing reservoir may instantly equalize into the regulating chamber and produce a quick application of the engine brakes to their maximum degree. When the brake valve is set in emergency position, the port 39 communicates with groove 35, port 29 and pipe 12, so that the piston 45 is balanced as to fluid pressure and the valve 48 is operated according to the pressure in the regulating chamber. If the emergency application is caused by a burst hose, or a parting of the train pipe, the valve device 15 operates as above described to open communication from the equalizing reservoir into the regulating chamber, and as the engineer's brake valve is immediately thrown to lap position, the pressure upon piston head 45 is balanced and the exhaust outlet port from the regulating chamber is closed so that the distributing valve device operates to supply air to the locomotive brake cylinders at the same time that the automatic train brakes are applied in emergency, as previously described.

In Figs. 12 to 19 I have shown a combined automatic and straight air brake equipment, comprising, in addition to the apparatus as above described a so-called "straight air" brake valve and connections for controlling and operating the locomotive brakes independently of the automatic train brakes. According to the arrangement shown in the diagram Fig. 12, the straight air brake valve 70 is inserted in the control pipes 11 and 12 between the distributing valve and the engineer's brake valve, and for convenience of description the section of the pipes from the straight air brake valve to the engineer's brake valve may be designated 11′ and 12′, respectively. The valve seat of the straight air brake valve contains ports 71, 72, 73 and 74 connected respectively with the pipes 11, 11′, 12 and 12′, and the centrally located exhaust port 81 leads to the atmosphere. On the valve seat is mounted the rotary valve 76 having through ports 82, 83 and 84, cavities 78 and 79, and exhaust cavity 80. The valve chamber 77 is supplied with air from the main reservoir through pipe 2 and the port 75. A reducing valve 85 may be inserted in the control pipe 11 for limiting the degree of pressure which may be admitted from the straight air brake valve to the regulating chamber to the desired maximum degree of brake cylinder pressure. The remainder of the apparatus being the same as before described, the operation of the combined equipment is as follows:— With the straight air brake valve in its normal running position, as indicated in Figs. 13 and 16, ports 71 and 72 are connected by cavity 78 and ports 73 and 74 are connected by cavity 79, so that the sections of the control pipes 11—11′ and 12—12′ respectively are connected and the automatic train and engine brakes may then be operated by the engineer's brake valve 3 in the same manner as previously described. When the engineer's brake valve is in running position with brakes released the engine brakes may be operated independently by means of the straight air brake valve, which may be turned to service position, as shown in Fig. 17, for applying the engine brakes alone. Air from the main reservoir pipe and chamber 77 then flows through ports 84 and 71 and pipe 11 to the regulating reservoir 10 charging the same to the desired degree of brake cylinder pressure, while air is also admitted to chamber 44 of the distributing valve through ports 82, 73 and pipe 12, whereupon the distributing valve device operates to charge the engine brake cylinders with air from the main reservoir, as before described. When the braking pressure is sufficient the straight air brake valve is turned to lap position, Fig. 18, in which port 71 is closed, while communication is open through ports 83 and 73 with pipe 12 and chamber 44 of the distributing valve. The engine braking pressure may then be graded down or released entirely by returning the straight air brake valve to running position, in which both the regulating reservoir 10 and the chamber 44 will be open to the atmosphere through the ports in the engineer's brake valve and the distributing valve will be actuated as before described to release the air from the brake cylinders to the atmosphere. When the automatic train brakes and engine brakes have been applied with the engineer's brake valve and said valve is in lap position, Fig. 9, the engine brakes may be released with the straight air brake valve by turning the same to release position, see Fig. 19, in which the exhaust cavity 80 connects both ports 71 and 73 and corresponding pipes 11 and 12 with the atmosphere through exhaust port 81, thereby causing the distributing valve to release the engine brakes but not affecting the automatic train brakes, which remain applied. The engine brakes may be controlled with the straight air brake valve, and if it is desired to apply the brakes on the engine and then release the automatic train brakes, this may be done by turning the straight air brake valve to service and lap positions and then returning the engineer's brake valve to running and release position. The automatic train brakes may then be applied in service while the engine brakes are still held applied with the straight air brake valve, since, when said valve is in either service or lap position, the preliminary discharge from the equalizing reservoir and pipe 11′ of the engineer's brake valve takes place through port 72, exhaust cavity 80 and port 81 to the atmosphere.

With the form of emergency valve device 15, as heretofore described, it is necessary for the engineer to move the engineer's brake valve to lap position in order to secure an automatic application of the brakes upon the engine in case of an emergency application caused by a break-in-two or burst train pipe, and with the combined equipment illustrated in Fig. 12 it would also be necessary to move the straight air brake valve from its release position, Fig. 19, in order to secure an automatic emergency application of the engine brakes. Ordinarily, a spring or other means would be employed for normally returning the straight air brake valve from its release position, Fig. 19, to its running position, Fig. 16, but in order to provide for all contingencies and insure the automatic application of the engine brakes in emergencies regardless of the positions of the brake valves, I have provided a modified form of the emergency valve device, shown in Fig. 20, in which the passages of pipes 11 and 12 are passed through the valve, the two parts of pipe 11 being connected by cavity 11ᵃ and the parts of pipe 12 by cavity 12ᵃ in the slide valve 64′ when the valve is in its normal position, where it remains at all times except in emergency application. When an emergency application is made, either by accident or by the engineer's brake valve, the piston 63 moves the valve 64′ to cut off communication from the brake valves through the control pipes 11 and 12 and opens communication from the equalizing reservoir and pipe 16 to pipe 11 leading to the regulating reservoir 10, whereby the pressure is equalized between said reservoirs. As the diaphragm valve 60 of the distributing valve device is then wide open, the air is released from the chamber 43 in the rear of piston 46, and as this piston is of greater area than piston 45, the differential pressure moves the valve over to open the port 50 and charge the engine brake cylinders. As soon as the piston 45 is moved away from its gasket the main reservoir pressure equalizes around said piston into chamber 44, since pipe 12 is closed at the emergency valve 15, or if preferred an additional port 86 communicating with supply pipe 2 may be provided in the emergency valve device, the said port being normally closed by the slide valve 64', but adapted, when the valve moves to emergency position, to communicate through cavity 12ª with the pipe 12 leading to chamber 44, thereby balancing piston 45 as to fluid pressure. In this case the pistons 45 and 46 may be of equal areas, as no differential pressure will be required to move the same. When the pressure in the train pipe is restored after an emergency application, the piston 63 moves the valve 64' back to normal position and communication is reëstablished from the distributing valve device through the control pipes 11 and 12 to the brake valve. From the foregoing description, it will now be apparent that by means of my improvement the usual auxiliary reservoirs and triple valves on the engine, or on engine and tender, may be dispensed with and these brakes operated with air from the main reservoir and controlled by the usual movements of the engineer's brake valve in operating the automatic train brakes or by the manipulation of the engineer's brake valve and the straight air brake valve each independently of the other.

It will be understood that the straight air or independent brake feature of my invention may be employed separately without the automatic brakes and that the same is not confined to use on a locomotive or head car, as in some cases it may be desired to employ the regulating valve device on cars of a train so that the brakes may be operated by varying the pressure in a pipe line connecting the regulating reservoirs on the cars.

Having now described my invention, what I claim as new and desire to secure by Letters Patent is:—

1. In a fluid pressure brake, the combination with a main reservoir, engineer's brake valve, and train pipe, of a valve device for controlling the supply of fluid under pressure from the source of pressure to the brake cylinder in service applications, and means operated by the movement of the brake valve in applying brakes to supply fluid to said valve device.

2. In a fluid pressure brake, the combination with a main reservoir, engineer's brake valve, and train pipe, of a valve device for controlling the supply of air from the main reservoir to the brake cylinder, and means for supplying fluid discharged in making reductions for applying the brakes, to said valve device.

3. In a fluid pressure brake, the combination with a main reservoir, engineer's brake valve, and train pipe, of a valve device for controlling the supply of air from the main reservoir to the brake cylinder, and means operated by the movement of the engineer's brake valve for supplying to said valve device air discharged in making reductions for applying the train brakes.

4. In a fluid pressure brake, the combination with a main reservoir, engineer's brake valve, and train pipe, of a valve device for supplying fluid under pressure from the source of pressure to the brake cylinder and controlled by fluid discharged from the system in making a reduction for applying the train brakes.

5. In a fluid pressure brake, the combination with a main reservoir, and engineer's brake valve having an equalizing reservoir of a valve device operated by the discharge from the equalizing reservoir for supplying air to the brake cylinder.

6. In a fluid pressure brake, the combination with a main reservoir, engineer's brake valve, train pipe, and brake cylinder, of a valve device for controlling the supply of air to a brake cylinder, and means governed by air from the preliminary discharge from the brake valve for operating said valve device.

7. In a fluid pressure brake, the combination with a main reservoir, engineer's brake valve, train pipe, and brake cylinder, of a valve device for controlling the supply of air to a brake cylinder, and having a regulating chamber, and a connection from the preliminary discharge port of the engineer's brake valve to said regulating chamber.

8. In a fluid pressure brake, the combination with a main reservoir, and train pipe, of a valve device operated by an increase in fluid pressure for supplying air from the main reservoir to the brake cylinder, and an engineer's brake valve having a train pipe connection and other ports for controlling the supply of air to said valve device for operating the same.

9. In a fluid pressure brake, the combination with a main reservoir, and train pipe, a reduction in pressure in which operates to apply the brakes, of a valve device for controlling the supply of air to a brake cylinder, and having a regulating chamber, and an engineer's brake valve having means for varying the train pipe pressure and for supplying air to said regulating chamber to apply the brakes.

10. In a fluid pressure brake, the combination with a main reservoir, engineer's brake valve, and train pipe, of a valve for controlling the supply of air to the brake cylinder, a piston for operating said valve, a regulating device for controlling the pressure upon one side of said piston, and ports controlled by the brake valve for supplying air to said regulating device to apply the brakes.

11. In a fluid pressure brake, the combination with a main reservoir, engineer's brake valve, and train pipe, of a valve for controlling the supply of air to the brake cylinder, a piston for operating said valve, a vent valve operated by the opposing pressures of the brake cylinder and a regulating chamber for controlling the release of air from one side of said piston to apply the brakes, and ports controlled by the brake valve for supplying air to said regulating chamber.

12. In a fluid pressure brake, the combination with a main reservoir, engineer's brake valve, train pipe and brake cylinder, of a valve for releasing air from the brake cylinder in service applications, a piston subject to fluid pressure from the main reservoir for operating said valve, and ports controlled by the brake valve for varying the pressure upon one side of said piston.

13. In a fluid pressure brake, the combination with a main reservoir, engineer's brake valve, train pipe, and brake cylinder, of a valve device for controlling the release of air from the brake cylinder in service applications, said brake valve having ports for supplying air to the train pipe and other ports for releasing air from said valve device to effect the release of the brakes.

14. In a fluid pressure brake, the combination with a main reservoir, engineer's brake valve, train pipe, and brake cylinder, of a valve mechanism for controlling the supply of air from the main reservoir to the brake cylinder and its release therefrom in service applications, said brake valve having a train pipe connection and other ports for supplying air to said valve mechanism for controlling its operation.

15. In a fluid pressure brake, the combination with a main reservoir, engineer's brake valve, train pipe, and brake cylinder, of a valve for controlling the supply of air from the main reservoir to the brake cylinder and its release therefrom, pistons for operating said valve, and means controlled by the brake valve for varying the pressure upon both of the pistons.

16. A fluid pressure brake apparatus, comprising a main reservoir, train pipe, engineer's brake valve, and brake cylinder in combination with a valve for controlling the release of air from the brake cylinder in service applications, a piston connected to said valve and subjected on one side to a constant fluid pressure, and means operated by the engineer's brake valve for supplying air to and releasing the same from the opposite side of said piston.

17. In a fluid pressure brake, the combination with a main reservoir, train pipe, engineer's brake valve, and brake cylinder, of a distributing valve device for controlling the supply of air to the engine brake cylinder and its exhaust therefrom, the engineer's brake valve having ports for controlling the operation of said valve device and adapted in one position to hold the engine brake applied while supplying air to the train pipe to release the train brakes.

18. In a fluid pressure brake, the combination with a main reservoir, engineer's brake valve, train pipe, and brake cylinder, of a distributing valve device for controlling the supply of air to the brake cylinder, means operated by the engineer's brake valve for supplying air to said valve device, and a valve mechanism operating in emergency applications for automatically supplying air to said distributing valve device for operating the same.

19. In a fluid pressure brake, the combination with a main reservoir, engineer's brake valve, train pipe, and brake cylinder, of a distributing valve device for controlling the supply of air to the brake cylinder and having a regulating chamber, means operated by the engineer's brake valve for supplying air to said chamber, and an automatic valve device operated by a sudden reduction in train pipe pressure for supplying air to said regulating chamber.

20. In a fluid pressure brake, the combination with a main reservoir, engineer's brake valve, train pipe, and brake cylinder, of a distributing valve device for controlling the supply of air to the brake cylinder and having a regulating chamber, a connection from the preliminary discharge of the equalizing reservoir of the engineer's brake valve to said regulating chamber, and an automatic valve device operated by a sudden reduction in train pipe pressure in emergency applications for opening communication from the brake valve reservoir to said regulating chamber.

21. In a fluid pressure brake, the combination with a main reservoir, train pipe, brake cylinder, and a distributing valve device for controlling the supply of air to the brake cylinder and having a regulating chamber, of an engineer's brake valve having a reservoir and ports for discharging air from said reservoir to the regulating chamber, and an automatic valve device operated by a sudden reduction in train pipe pressure for opening communication from the brake valve reservoir to the regulating chamber, and for cutting off communication from the regulating chamber to the engineer's brake valve.

22. In a fluid pressure brake, the combination with a main reservoir, brake valve, train pipe, and brake cylinder, of a distributing valve device for controlling the supply of air to the brake cylinder, ports in the brake valve for controlling the action of the distributing valve, an automatic valve device operated by a sudden reduction in train pipe pressure for supplying air to the distributing valve and cutting off communication from the same to the brake valve.

23. In a fluid pressure brake, the combination with a train pipe, a brake cylinder, and a brake valve for effecting a reduction in train pipe pressure to apply brakes, of a valve device operated by the air discharged from the brake valve for controlling the supply of air to the brake cylinder.

24. In a fluid pressure brake, the combination with a brake cylinder, a train pipe, a valve device having a local regulating chamber an increase in pressure in which operates to supply air to the brake cylinder, an automatic valve device operated by a reduction in train pipe pressure for supplying air to said regulating chamber, of a brake valve for reducing the train pipe pressure and for supplying fluid directly to said regulating chamber.

25. In a fluid pressure brake, the combination with a brake cylinder, a train pipe, a valve device having a local regulating chamber an increase in pressure in which operates to supply air to the brake cylinder, an automatic valve device operated by a reduction in train pipe pressure for supplying air to said regulating chamber, of a brake valve having ports for supplying and releasing air to and from said regulating chamber and for effecting a reduction in train pipe pressure.

26. In a fluid pressure brake, the combination with a brake cylinder, and a valve device having a regulating chamber, and governed by the opposing pressures of the regulating chamber and brake cylinder for controlling the supply of air to and graduating the pressure in the brake cylinder in accordance with the degree of pressure in the regulating chamber, of a brake valve having ports for supplying air to said regulating chamber.

27. In a fluid pressure brake, the combination with a brake cylinder, a train pipe, a valve device having a local regulating chamber an increase in pressure in which operates to supply air to the brake cylinder, an automatic valve device operated by a reduction in train pipe pressure for supplying air to said regulating chamber, of means operating upon a reduction in train pipe pressure for supplying air to said regulating chamber and a brake valve for effecting a reduction in train pipe pressure and for also supplying air directly to said regulating chamber to apply the brakes.

28. In a fluid pressure brake, the combination with a brake cylinder, a regulating chamber, and a valve device operated by the opposing pressures of the regulating chamber and the brake cylinder for controlling the supply of air to the brake cylinder in graduated applications, of a brake valve for supplying air to the regulating chamber.

29. In a fluid pressure brake, the combination with a main reservoir, train pipe and brake cylinder, of a valve device having a regulating chamber, an increase in pressure in which operates to supply air from the main reservoir to the brake cylinder, and a brake valve having ports for supplying air to said regulating chamber.

30. A combined automatic and straight air brake apparatus, comprising a main reservoir, train pipe, a distributing valve device for supplying air to the engine brake cylinder, an engineer's brake valve for operating the train brakes and having means for controlling the action of the distributing valve, and an independent brake valve for supplying air to the distributing valve to effect an application of the brakes.

31. A combined automatic and straight air brake apparatus, comprising a main reservoir, train pipe, a distributing valve device for supplying air to the engine brake cylinder, an engineer's brake valve for operating the train brakes and having ports and pipe connections for controlling the action of the distributing valve, and a straight air brake valve inserted in said controlling pipe connections between the engineer's brake valve and the distributing valve.

32. A combined automatic and straight air brake apparatus, comprising a main reservoir, train pipe, a distributing valve device for supplying air to the engine brake cylinder and for releasing the same, an engineer's brake valve for operating the train brakes and having ports for supplying air to the distributing valve, and a straight air brake valve also having ports for supplying air to the distributing valve for controlling the action of the same.

33. A combined automatic and straight air brake apparatus, comprising a main reservoir, train pipe, a distributing valve device for supplying air to the engine brake cylinder and having a regulating chamber, an engineer's brake valve for operating the train brakes and having ports for controlling the pressure in said regulating chamber, and a straight air brake valve also having ports for supplying air to said regulating chamber.

34. A combined automatic and straight air brake apparatus, comprising a main reservoir, train pipe, a distributing valve device for supplying air to the engine brake cylinder, an engineer's brake valve for operating the train brakes and having ports and pipe connections for controlling the action of the distributing valve device, and a straight air brake valve inserted in said pipe connections and having ports for controlling the same independently of the engineer's brake valve.

35. A combined automatic and straight air brake apparatus, comprising a main reservoir, train pipe, a distributing valve device for supplying air to the engine brake cylinder and having a regulating chamber, an engineer's brake valve for operating the train brakes and having a port controlling a passage leading from the equalizing reservoir to said regulating chamber, and a straight air brake valve having ports for supplying air to said regulating chamber and for opening the discharge from the equalizing reservoir to the atmosphere.

36. A combined automatic and straight air brake apparatus, comprising a main reservoir, train pipe, a distributing valve device for supplying air to the engine brake cylinder, and having a regulating chamber, an engineer's brake valve for operating the train brakes and having a preliminary discharge port for supplying air to said regulating chamber, and a straight air brake valve having ports operating independently of the engineer's brake valve for controlling the passage from the engineer's brake valve to said regulating chamber, for supplying air to and releasing the same from the regulating chamber, and for opening the passage from the preliminary discharge port of the engineer's brake valve to the atmosphere.

37. A fluid pressure brake apparatus, comprising a main reservoir, train pipe, engineer's brake valve for controlling the automatic train brakes, a distributing valve device for supplying and releasing air to and from the engine brake cylinders and having a regulating chamber, ports in said engineer's brake valve for connecting the preliminary discharge from the equalizing reservoir with the said regulating chamber, a straight air brake valve having ports for controlling the supply of air to and the release of the same from said regulating chamber, and an automatic valve device operated by a sudden reduction in train pipe pressure in emergency applications for cutting off connection from the straight air brake valve to the distributing valve device.

In testimony whereof I have hereunto set my hand.

WALTER V. TURNER.

Witnesses:
 R. F. EMERY,
 JAMES B. MACDONALD.